US012731292B2

(12) United States Patent
Cho et al.

(10) Patent No.: US 12,731,292 B2
(45) Date of Patent: Sep. 8, 2026

(54) METHOD OF LEARNING PARAMETER OF SENSOR FILTER AND APPARATUS FOR PERFORMING THE SAME

(71) Applicant: SAMSUNG ELECTRONICS CO., LTD., Suwon-si (KR)

(72) Inventors: Sung Kwang Cho, Suwon-si (KR); Geonwoo Kim, Suwon-si (KR); Yang Ho Cho, Suwon-si (KR); Dong Kyung Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 454 days.

(21) Appl. No.: 18/134,328

(22) Filed: Apr. 13, 2023

(65) Prior Publication Data

US 2024/0135587 A1 Apr. 25, 2024

(30) Foreign Application Priority Data

Oct. 13, 2022 (KR) ........................ 10-2022-0131619

(51) Int. Cl.
*G06T 7/90* (2017.01)

(52) U.S. Cl.
CPC ...... *G06T 7/90* (2017.01); *G06T 2207/10024* (2013.01); *G06T 2207/20081* (2013.01)

(58) Field of Classification Search
CPC ............. G06T 7/90; G06T 2207/10024; G06T 2207/20081; G06T 3/4053; G06T 5/70; G06T 5/92; G06T 7/10; G06T 7/13; G06N 20/00; G06V 40/16; H04N 25/11
USPC .......................................................... 382/155
See application file for complete search history.

(56) References Cited

U.S. PATENT DOCUMENTS

| | | | | |
|---|---|---|---|---|
| 8,643,742 | B2 | 2/2014 | Proca | |
| 9,030,580 | B2 | 5/2015 | Meng et al. | |
| 9,300,932 | B2 | 3/2016 | Knight et al. | |
| 9,866,810 | B2 | 1/2018 | Knight et al. | |
| 9,955,128 | B2 * | 4/2018 | Ashida | H04N 23/673 |
| 10,633,007 | B1 * | 4/2020 | Kim | G06V 20/58 |
| 2011/0237882 | A1 * | 9/2011 | Saito | G06T 7/0012 600/109 |
| 2012/0092520 | A1 | 4/2012 | Proca | |
| 2013/0076913 | A1 * | 3/2013 | Xu | H04N 23/611 348/169 |
| 2015/0092071 | A1 | 4/2015 | Meng et al. | |
| 2017/0109644 | A1 * | 4/2017 | Nariyambut Murali | G06N 7/01 |
| 2017/0155852 | A1 * | 6/2017 | von Cramon | H04N 23/51 |
| 2020/0334787 | A1 * | 10/2020 | Smirnov | G06T 3/4023 |
| 2021/0295592 | A1 * | 9/2021 | von Cramon | G06N 3/08 |

(Continued)

OTHER PUBLICATIONS

Ethan Tseng et al., "Differentiable Compound Optics and Processing Pipeline Optimization for End-to-end Camera Design", ACM Transactions on Graphics, vol. 40, No. 0, Article 0. Publication date: Aug. 2021, (18 pages).

*Primary Examiner* — Ali Bayat
(74) *Attorney, Agent, or Firm* — Sughrue Mion, PLLC

(57) ABSTRACT

A method of learning a parameter of a sensor filter and an apparatus for performing the method are provided. The learning method may include performing a simulation on a target image for each spectrum of a sensor filter, obtaining an output value by inputting the simulated image to a vision model for a vision task, and learning a parameter of the sensor filter based on a loss between a label of the vision model and the output value of the vision model.

19 Claims, 6 Drawing Sheets

(56) References Cited

U.S. PATENT DOCUMENTS

| | | | | |
|---|---|---|---|---|
| 2021/0350584 | A1 | 11/2021 | Han et al. | |
| 2022/0206931 | A1* | 6/2022 | Hwang | G06F 40/279 |
| 2022/0207647 | A1 | 6/2022 | Lin et al. | |
| 2022/0301123 | A1* | 9/2022 | Mosleh | G06N 3/08 |
| 2025/0068960 | A1* | 2/2025 | Yu | G06N 20/00 |

* cited by examiner

METHOD OF LEARNING PARAMETER OF SENSOR FILTER AND APPARATUS FOR PERFORMING THE SAME

CROSS-REFERENCE TO RELATED APPLICATION

This application claims priority to Korean Patent Application No. 10-2022-0131619, filed on Oct. 13, 2022, in the Korean Intellectual Property Office, the disclosure of which is incorporated herein by reference in its entirety.

BACKGROUND

1. Field

Methods and apparatuses consistent with embodiments relate to a learning method of a parameter of a sensor filter and an apparatus for performing the learning method.

2. Description of Related Art

Image sensors are used not only in cameras in everyday life, but also in cameras for various vision tasks, such as object detection, segmentation, recognition, and object tracking.

A general camera may generally use an image sensor (a Red Green Blue (RGB) sensor) having an RGB color filter in a visible light region. Vision tasks may use not only an RGB sensor but also various types of filter sensors, such as an RGB-infrared (IR) sensor, a monochrome sensor, and a hyper spectral sensor including a combination of short wavelength filters.

A vision task performance may be limited according to a specific color filter spectrum and an Image Signal Processor (ISP). For example, similar colors in an image may cause an error arising from an RGB spectrum during classification, an insufficient color filter may reduce an ability to distinguish colors from one another, a decreasing dynamic range (DR) in a dark environment may lead to a difficulty in detecting an object, and light reflection may increase blur and noise on an image, making it difficult to identify an object.

SUMMARY

One or more embodiments may address at least the above problems and/or disadvantages and other disadvantages not described above. Also, the embodiments are not required to overcome the disadvantages described above, and an embodiment may not overcome any of the problems described above.

According to an aspect of an embodiment, there is provided a method of learning a parameter of a sensor filter, the method including: performing a simulation on a target image for each spectrum of the sensor filter; obtaining an output value by inputting the simulated image to a vision model for a vision task, and learning a parameter of the sensor filter based on a loss between a label of the vision model and the output value of the vision model.

The vision model is a first vision model, the label of the vision model is a first label, and the learning of the parameter of the sensor filter may include learning the parameter of the sensor filter further based on at least one of: a loss between a second label of a second vision model and the output value of the first vision model, a loss of the simulated image on the basis of a color space based on a color perception of a human, and a normalization loss based on inflection of the simulated image.

The learning of the parameter of the sensor filter may include learning the parameter of the sensor filter and a parameter of the vision model to reduce the loss between the label of the vision model and the output value of the vision model.

The learning of the parameter of the sensor filter and the parameter of the vision model may include correcting the parameter of the sensor filter and the parameter of the vision model in response to the loss; performing a second simulation on the target image based on the corrected parameter of the sensor filter, obtaining an output value by inputting the second simulated image to the vision model of which parameter is corrected, and calculating a loss between a label of the vision model of which parameter is corrected and the output value of the vision model of which the parameter is corrected.

The learning of the parameter of the sensor filter may include learning a value of the spectrum corresponding to each of channels included in the sensor filter.

The vision model may include at least one of: a vision model for edge detection; a vision model for segmentation, a vision model for object detection, a vision model for face recognition and a vision model for super resolution.

The obtaining of the output value may include preprocessing the simulated image to correspond to the vision task.

The preprocessing may include at least one of: removing noise from the simulated image, normalizing the simulated image, performing a high dynamic range (HDR) processing on the simulated image, and adjusting a size of the simulated image.

The performing of the simulation on the target image for each spectrum of the sensor filter may include performing the simulation based on an illuminant spectrum and an object reflectance for each wavelength band of the target image.

The learning of the parameter of the sensor filter may include calculating the lose between the label of the vision model and the output value of the vision model, determining whether the calculated lose is greater than a predetermined target lose, and based on the calculated lose being greater than the predetermined target lose, updating the spectrum of the sensor filter.

According to an aspect of an embodiment, there is provided a non-transitory computer-readable storage medium storing instructions that, when executed by a processor, cause the processor to perform the method of learning the parameter of the sensor filter.

According to an aspect of an embodiment, there is provided an image processing apparatus based on a vision model, the image processing apparatus including: a sensor filter comprising a plurality of filters specialized for the vision model and configured to have different intensity characteristics, one or more processors, a memory storing one or more programs, and the one or more processors are configured to execute the one or more programs to receive a target image captured by using the sensor filter and obtain a result corresponding to a vision task based on the vision model by inputting the received image to the vision model.

The one or more processors may be further configured to execute the one or more programs to learn a parameter of the vision model and a parameter of the sensor filter.

The one or more processors may be further configured to execute the one or more programs to learn a parameter of the sensor filter to reduce a loss between a label of the vision model and an output value of the vision model by inputting a simulated image with respect to the target image for each spectrum of the sensor filter to the vision model for the vision task and thus obtain an output value.

The vision model may include at least one of: a vision model for edge detection, a vision model for segmentation, a vision model for object detection, a vision model for face recognition, and a vision model for super resolution.

The one or more processors may be further configured to execute the one or more programs to learn a parameter of the sensor filter and a parameter of the vision model based on a loss between a label of the vision model and an output value of the vision model, and the plurality of filters of the sensor filter may be configured based on the learned parameter of the sensor filter and the learned parameter of the vision model.

The one or more processors may be further configured to execute the one or more programs to preprocess the target image simulated to correspond to the vision task.

The preprocessing may include at least one of: removing noise from the simulated image, normalizing the simulated image, performing a high dynamic range (HDR) processing on the simulated image, and adjusting a size of the simulated image.

The one or more processors may be further configured to execute the one or more programs to perform the simulation based on an illuminant spectrum and an object reflectance for each wavelength band of the target image.

The one or more processors may be further configured to execute the one or more programs to calculate a lose between a label of the vision model and an output value of the vision model, determine whether the calculated lose is greater than a predetermined target lose, and based on the calculated lose being greater than the predetermined target lose, update a spectrum of the sensor filter.

Additional aspects of embodiments will be set forth in part in the description which follows and, in part, will be apparent from the description, or may be learned by practice of the disclosure.

BRIEF DESCRIPTION OF THE DRAWINGS

The above and/or other aspects will be more apparent by describing certain embodiments with reference to the accompanying drawings, in which.

DETAILED DESCRIPTION

Figure 1:
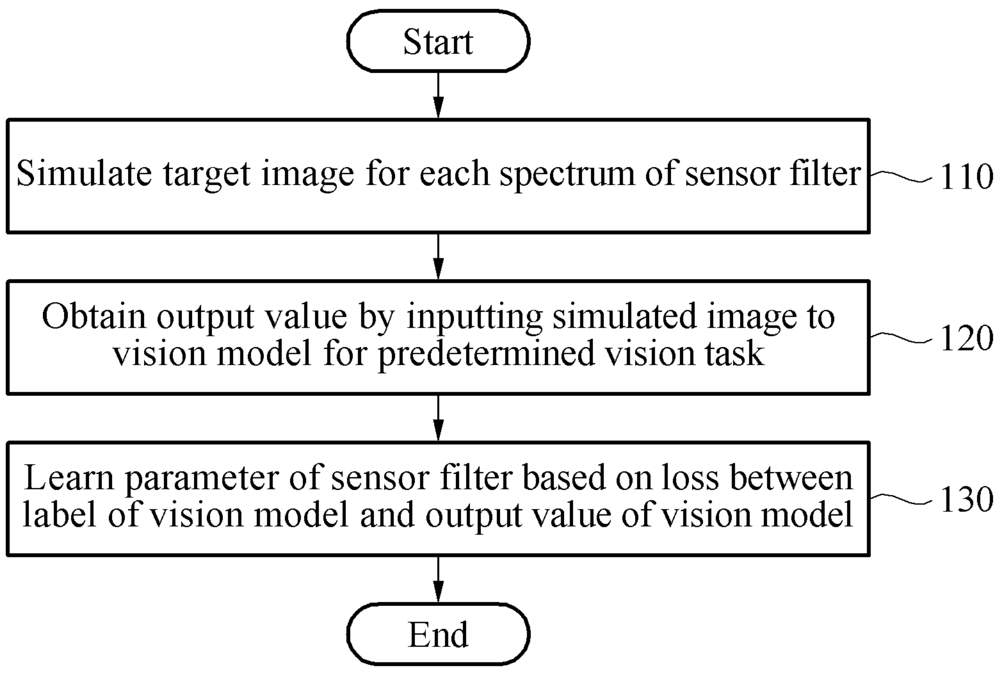
FIG. 1 is a flowchart illustrating a method of learning a parameter of a sensor filter in an embodiment.

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of the embodiments, a detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the embodiments described above and an element having a common function. Unless otherwise mentioned, the descriptions of the embodiments may be applicable to the following embodiments and thus, duplicated descriptions will be omitted for conciseness.

FIG. 1 is a flowchart illustrating a method of learning a parameter of a sensor filter in an embodiment.

Learning according to an embodiment may be performed through an apparatus. The apparatus may include one or more processors, a memory, and one or more programs stored in the memory and executed by the one or more processors. A method of learning a parameter of a sensor filter to be described hereinafter may be performed by the programs.

In operation 110, an apparatus may simulate a target image for each spectrum of a sensor filter.

A parameter of the sensor filter may be set to be a default value or a random value. Alternatively, a Red Green Blue (RGB) sensor spectrum may be used.

The sensor filter according to an embodiment may include an RGB color filter. The sensor filter may optionally include an infrared (IR) cut filter.

In an embodiment, the apparatus may generate raw data simulated for a target image as learning data for learning a parameter in a wavelength spectrum of the sensor filter. To this end, a simulation may be performed based on an illuminant spectrum fixed for each wavelength, an object reflectance for each wavelength band of the target image, and an IR filter spectrum value.

In operation 120, the apparatus may obtain an output value by inputting the simulated image to a vision model for a predetermined vision task.

In an embodiment, a plurality of simulated images may be input to the vision model to perform the vision task. The vision model may, for example, be a vision model among various vision models, such as a vision model for edge detection, a vision model for segmentation, a vision model for object detection, a vision model for face recognition, and a vision model for super resolution, and a vision model for one or more vision tasks may be used.

When a plurality of vision models are used, the plurality of vision models may operate in parallel in response to an input of the simulated image.

The apparatus may learn a parameter value corresponding to a spectrum of the sensor filter such that a loss between the label value of the vision model and the output value of the vision model of the simulated image is reduced. In this case, the apparatus may simultaneously learn the parameter of the vision model and the parameter of the sensor filter.

A deep learning methodology that optimizes by repeatedly learning two parameters may be applied to the learning method according to an embodiment. The parameter of the vision model and the parameter of the sensor filter may be learned according to a methodology of continuously updating an internal parameter of the vision model. For example, various optimization methods may be applied, for example, applying a gradient descent method so that each block is differentiable, reinforcement learning, or grid search. In learning the parameter of the sensor filter, the sensor filter may include a plurality of channels and the plurality of channels may be divided into each channel, so that the parameter with respect to each channel may be learned for each spectrum. For example, the sensor filter may include 3 general RGB channels or more. In an embodiment, learning may continue according to the predetermined number of cycles or until a loss reaches a predetermined target.

The loss according to an embodiment may be calculated based on the loss function of the equation below.

[Equation 1]

#1 #2 #3

$$\min_{Q,M}\lambda_1\left\|N\left(C^TQ\right)M-C^TX\right\|_F^2+\lambda_2\left\|f_1\left(N\left(C^TQ\right)\right)_{a,b}-f_2(C_{31ch})_{a,b}\right\|_F^2+\lambda_3\sum_{i=1}^{3}|Q_i''|^2$$

s.t. $B_{low}\le Q\le B_{up}$, $f_1$: *EdgeNet* (*RAW* to Edge Image), $Smooth_{loss}$ *for Sensor Filter*

$f_2$: Sobel Filter, $N$: Noise Generation

In an embodiment, the apparatus may perform a preprocessing process before inputting simulated images to the vision model.

Noise may be removed from images with much noise, a normalization operation may be performed so that an image has a numerical value between 0 and 255, a High Dynamic Range (HDR) algorithm may be used, the size of an image simulated to support a vision model may be adjusted, or Image Signal Processing (ISP) may be performed on the simulated image.

In an embodiment, the simulated images may be input as they are to the vision model, or images corrected through at least one of the preprocessing processes described above may be input to the vision model and then an output value may be obtained from the vision model.

In operation 130, the apparatus may learn the parameter of the sensor filter such that a loss between the label of the vision model and the output value of the vision model is reduced.

In an embodiment, when a result value is output from the vision models by the vision tasks, respectively, a loss may arise between the label (or ground truth) value of the vision model and the output of the vision model in response to the input of the simulated image.

In an embodiment, a different type of loss may be applied to each vision model outputting a result in order to increase performance for each vision task in an optimization direction. For example, an L1 loss and an L2 loss may be generally used or a loss calculated in another manner may be used.

Equation 1 may be an example of expressing a loss function for optimizing the parameter of the sensor filter for the vision model that performs the vision task of edge detection.

Here, Q may denote the product of the sensor filter and an IR cut filter value, C may denote the product of an illuminant and an object reflectance of the target image, N may denote noise, and M may correspond to a setting parameter for combining images as a transformation matrix for mapping a sensor filter value to a certain standard space (e.g., a space including x, y, and z, and the like). X may denote a normalized value of a CIE XYZ color space. $C^TQ$ may denote simulated raw data.

In Equation 1 above, term #1 may be to derive values of Q and M that minimize the L2 loss and to minimize the loss of the simulated image on a basis of a color space based on the human's color perception and may correspond to a term to determine a degree to which RGB is visually expressed by the sensor filter.

Term #2 according to an embodiment may be a term for performance of a vision task for edge detection and correspond to a term for minimizing a difference with a label of an actually estimated edge.

$f_1$ may denote a convolutional neural network for generating an edge, and $f_2$ may denote a function for generating a label. The edge may be detected and the label may be generated in each of 31 spectrums.

In an embodiment, when the parameter of the vision model for two vision tasks or more is learned, a function for the vision tasks may be added to term #2 for calculation. For example, a function for a first vision task and a function for a second vision task may be simultaneously learned in term #2.

Term #3 may be to minimize a normalization loss based on inflection of the simulated image for each channel of the sensor filter and correspond to a term for correcting the curvature of the sensor filter, such as a slope between derived parameters.

In an embodiment, when the importance of an RGB value is low in visual representation, term #1 may be omitted, and when a vision model for a vision task other than edge detection is applied, a term for the vision model may be added to the loss function in term #2.

As in the above example, the loss function may be designed according to the vision task and a sensor filter spectrum and the parameter of the vision model may be learned based on a result of the loss function.

Figure 2:
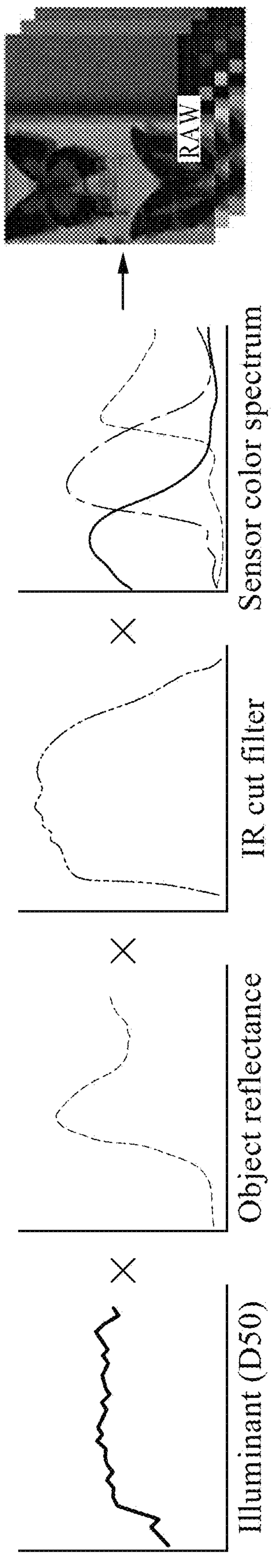
FIG. 2 illustrates a method of simulating an image in an embodiment.

FIG. 2 illustrates a method of simulating an image in an embodiment.

In an embodiment, a simulation may be performed to obtain image raw data input to a vision model to learn parameters of a sensor filter and a vision model.

Image simulation may be performed by inputting a sensor filter spectrum, an illuminant spectrum, and an object reflectance for each wavelength band of a target image. Here, the illuminant spectrum and the object reflectance may be fixed values corresponding to a spectrum, and an IR cut filter may be a fixed value or included in a learning target.

The object reflectance for each wavelength band may be obtained by using a hyperspectral imaging (HIS) apparatus or by using a model that transforms, into an HIS, an image taken by an existing RGB sensor and a Cyan, Magenta, Yellow (CMY) sensor.

The illuminant spectrum may use standard illuminant information, such as D50, D65, and A, or an arbitrary synthetic spectrum. The brightness of the illuminant may be set by adjusting the intensity value of the applicable illuminant spectrum.

Figure 3:
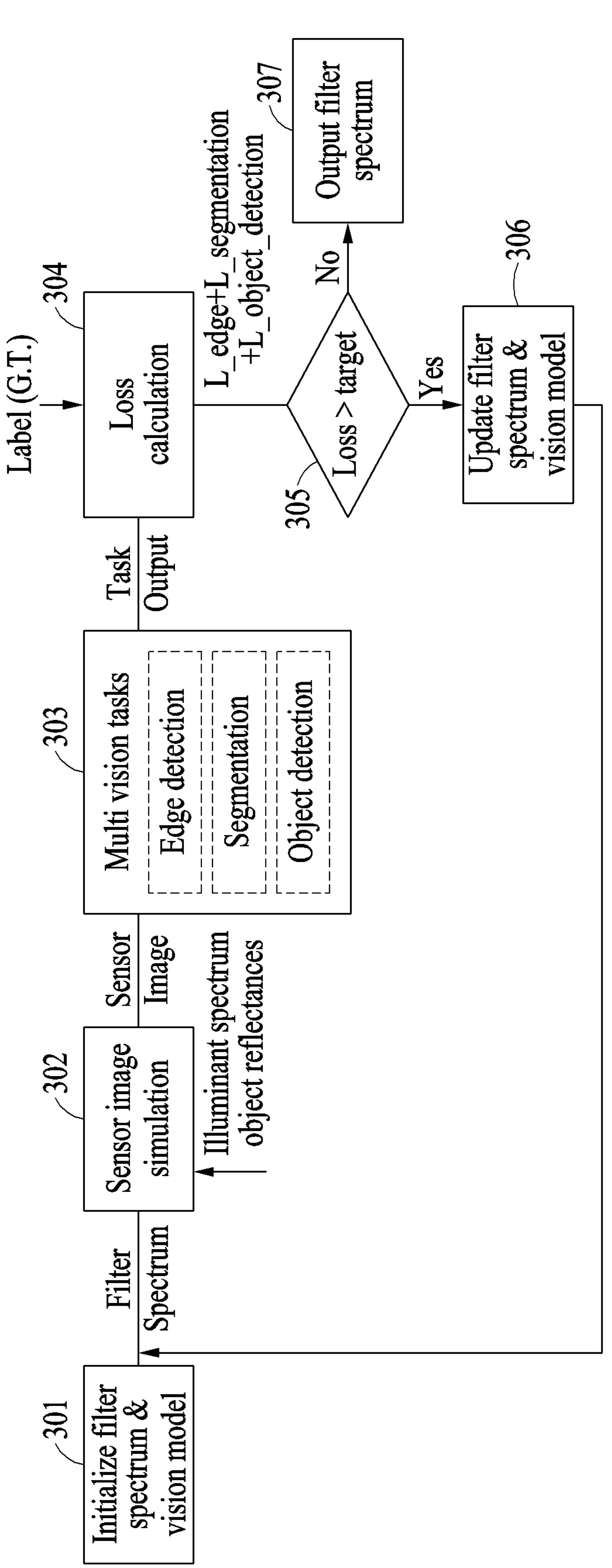
FIG. 3 is a diagram illustrating a method of learning a parameter of a sensor filter and a parameter of a vision model, in an embodiment.

FIG. 3 is a diagram illustrating a method of learning a parameter of a sensor filter and a parameter of a vision model, in an embodiment.

A preprocessing process may be omitted in a method according to an embodiment may omit.

In operation 301, an apparatus may input an initial value of a spectrum parameter of a sensor filter and an initial value of a parameter of a vision model. The parameter of the sensor filter and the parameter of the vision model may be set to be default values or random values.

In operation 302, the apparatus may perform a simulation on an image using the sensor filter.

In an embodiment, the simulation may be performed based on an illuminant spectrum fixed for each wavelength, an object reflectance for each wavelength band of the target image, and an IR filter spectrum value.

The fixed spectrum value may be determined as described above with reference to FIG. 2 and raw data simulated to correspond to the sensor filter spectrum may be obtained by performing learning on the sensor filter set as the default value or the random value.

In operation 303, the apparatus may perform a vision task using the simulated image.

The vision task according to an embodiment may include edge detection, classification, and object detection and for this purpose, vision models for performing the tasks, respectively, in parallel may be used.

The vision model may include a conventional computer vision algorithm, a convolutional neural network (CNN), a transformer network, and the like. The vision model may output a result value suitable for the vision task based on an initially set parameter.

In operation 304, the apparatus may compare the label of the vision model to the output value of the vision model to calculate a loss.

In an embodiment, the apparatus may calculate a difference between a label, which corresponds to ground truth of a data set of the vision model, and an output result value of the vision model. In this case, the apparatus may select a value suitable for evaluating a performance of the vision task, such as an L1 loss, which is Least Absolute Deviations (LAD), and an L2 loss, which is Mean Square Error (MSE) and use the selected value for calculating the loss. The label of the vision model may refer to a label of data for learning the vision model.

In operation 305, the apparatus may determine whether the calculated loss is greater than a predetermined target value.

When the calculated loss is greater than the predetermined target value, the apparatus may repeat updating the parameter of the sensor filter spectrum and the parameter of the vision model in a direction of decreasing the loss in operation 306. In operation 307, when the calculated loss is not greater than the predetermined target value, the apparatus may output the sensor filter spectrum.

The parameter value of the sensor filter spectrum and the parameter value of the vision model may be determined based on the learned parameters in an embodiment.

As described above, the sensor filter may include at least a plurality of channels and a spectrum corresponding to each channel of the plurality of channels may be learned. In an embodiment, in order to implement a multi-channel filter as a single filter, the apparatus may correct edges between channels included in the sensor filter, using differentiation.

Figure 4:
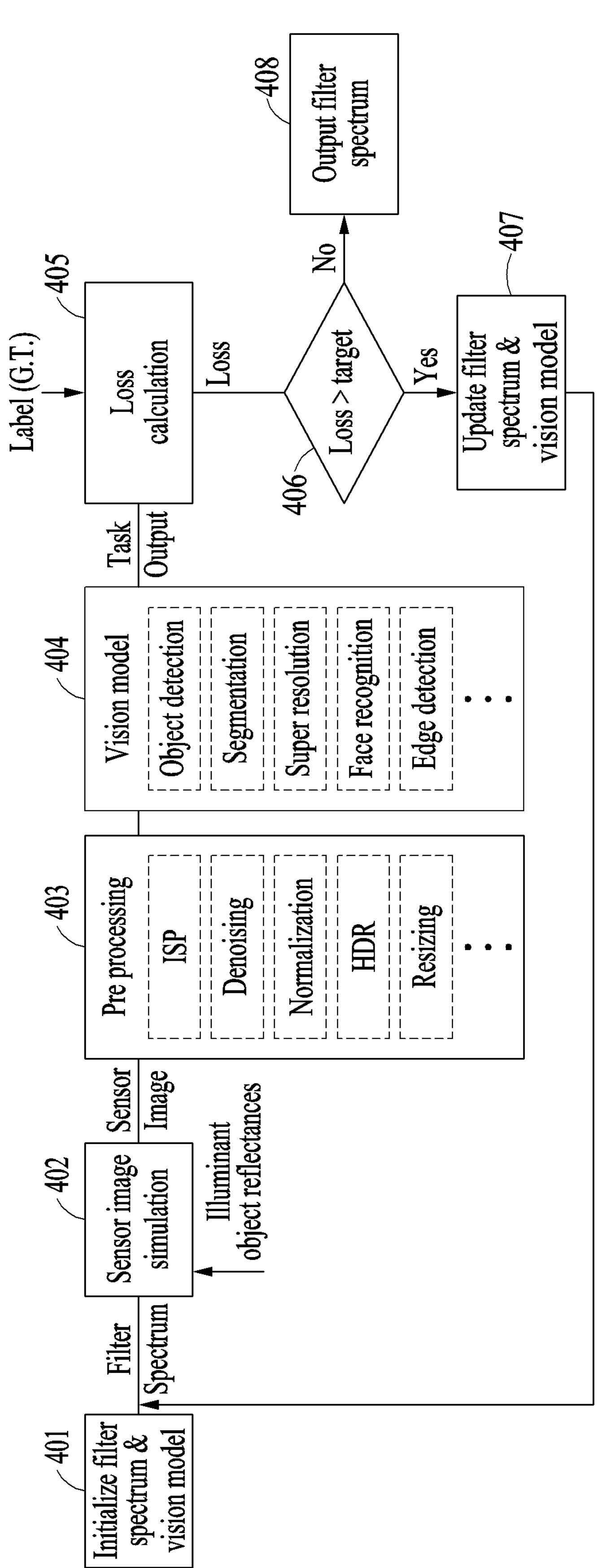
FIG. 4 is a diagram illustrating a method of learning a parameter of a sensor filter in which the method includes a preprocessing process, in an embodiment.

FIG. 4 is a diagram illustrating a method of learning a parameter of a sensor filter in which the method includes a preprocessing process, in an embodiment.

In operation 401, an apparatus may input an initial value of a spectral parameter of a sensor filter and an initial value of a parameter of a vision model. The parameter of the sensor filter and the parameter of the vision model may be set to be default values or random values.

In operation 402, the apparatus may perform simulation on an image using the sensor filter.

In an embodiment, the apparatus may perform simulations, respectively, based on an illuminant spectrum fixed for each wavelength, an object reflectance for each wavelength band of a target image, and an IR filter spectrum value.

In operation 403, the apparatus may perform a preprocessing on the simulated image.

The apparatus may change input data so that the simulated image fits an applicable vision task. For example, the apparatus may perform ISP, remove noise, normalize a simulated image, process an HDR on the simulated image, or adjust the size of the image. The preprocessing processes listed above may be used and selected to be performed in parallel in correspondence with each vision task.

In operation 404, the apparatus may perform a vision task using the simulated image.

The vision task according to an embodiment may include edge detection, classification, and object detection and for this purpose, a vision model for performing each task in parallel may be used.

The vision model may include a conventional computer vision algorithm, a CNN, a transformer network, and the like. The vision model may output a result value corresponding to an input of an image preprocessed to suit the vision task based on an initially set parameter.

In operation 405, the apparatus may compare the label of the vision model to the output value of the vision model to calculate a loss.

In an embodiment, the apparatus may calculate a difference between the label, which corresponds to ground truth of a data set of the vision model, and the output value of the vision model. In this case, the apparatus may select a value suitable for evaluating a performance of the vision task, such as an L1 loss, which is LAD and an L2 loss, which is MSE, and use the selected value to calculate the loss.

In operation 406, the apparatus may determine whether the calculated loss is greater than a predetermined target value.

When the calculated loss is greater than the predetermined target value, the apparatus may repeat updating the parameter of the sensor filter spectrum and the parameter of the vision model, respectively, in a direction of decreasing the loss in operation 407. In operation 408, when the calculated loss is not greater than the predetermined target value, the apparatus may output the sensor filter spectrum.

The parameter value of the sensor filter spectrum and the parameter value of the vision model may be determined based on the learned parameters in the embodiment.

In a learning process of the sensor filter according to an embodiment, the preprocessing and the vision task may be configured in various combinations as described with reference to FIGS. 3 and 4. Embodiments according to various scenarios are shown.

For example, when one vision task is included in the learning process of the sensor filter, the apparatus may optimize the parameter of the sensor filter and the parameter of the vision model in a direction of increasing accuracy of an output (e.g., edge map) of the vision task.

When several vision models (e.g., Edge Detection, Segmentation, and Object Detection) are included at the same time as shown in FIG. 3 in the learning process of the sensor filter, the apparatus may output a value by receiving inputs of the sensor image using various vision models at the same time and processing the inputs in parallel, measure losses for all of the applicable vision tasks, respectively, and learn the parameter of the sensor filter and the parameters of various vision models in a direction of decreasing the loss for optimization.

FIG. 4 may include preprocessing (e.g., ISP) for the input of applicable vision tasks while simultaneously applying a plurality of vision models (e.g., Edge Detection, Segmentation, and Object Detection). The apparatus may output a value by receiving inputs of the preprocessed image using multiple vision models at the same time and processing the inputs. In this case, the apparatus may measure not only the losses for all the vision tasks but also a result of the preprocessing output to learn parameters of the sensor filter and the vision models.

Figure 5:
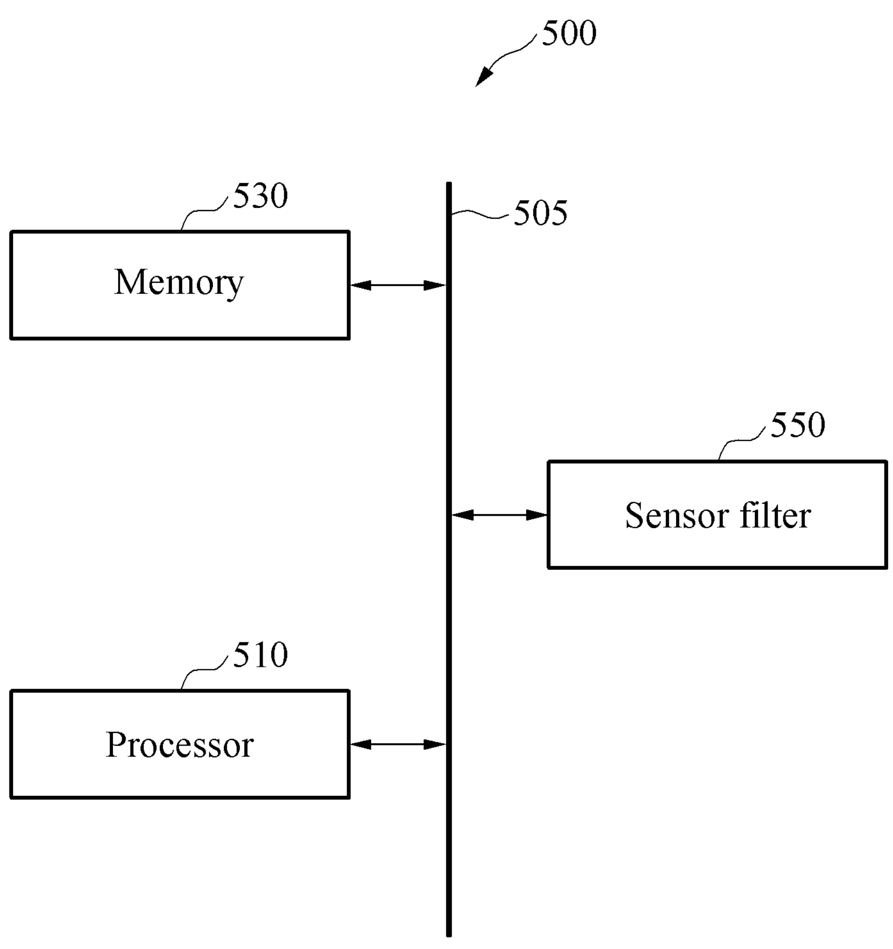
FIG. 5 is a diagram illustrating a structure of an image processing apparatus including a sensor filter designed with a learned parameter, in an embodiment.

FIG. 5 is a diagram illustrating a structure of an image processing apparatus including a sensor filter designed with learned parameters, in an embodiment.

An image processing apparatus 500 may include a memory 530, one or more processors 510, and a sensor filter 550 and may include one or more programs stored in the memory and configured to be executed by the one or more processors.

Here, the sensor filter 550 may be designed with a parameter learned by using an output value of a vision task of a vision model with respect to a simulated image for each spectrum, based on a method of learning a parameter of the sensor filter described above with reference to FIGS. 1 to 4.

Accordingly, the image processing apparatus 500 may acquire, through a program, a result corresponding to a vision task by capturing a target image with a sensor filter and inputting the captured image to a vision model for a predetermined vision task.

A spectrum of the sensor filter optimized for the vision task may have a parameter derived by repeatedly updating a signal processor of the vision model for the spectrum of the sensor filter and the vision task.

Here, a color filter spectrum may have 3 channels or more. The signal processor of the vision model may include a convolutional computer vision algorithm and a neural network as an algorithm for the vision task.

The vision model may be, for example, a vision model among various vision models, such as a vision model for edge detection, a vision model for segmentation, a vision model for object detection, a vision model for face recognition, and a vision model for super resolution and a vision model that learns a parameter for one or more vision tasks may be used.

Figures 6A, 6B, 6C:
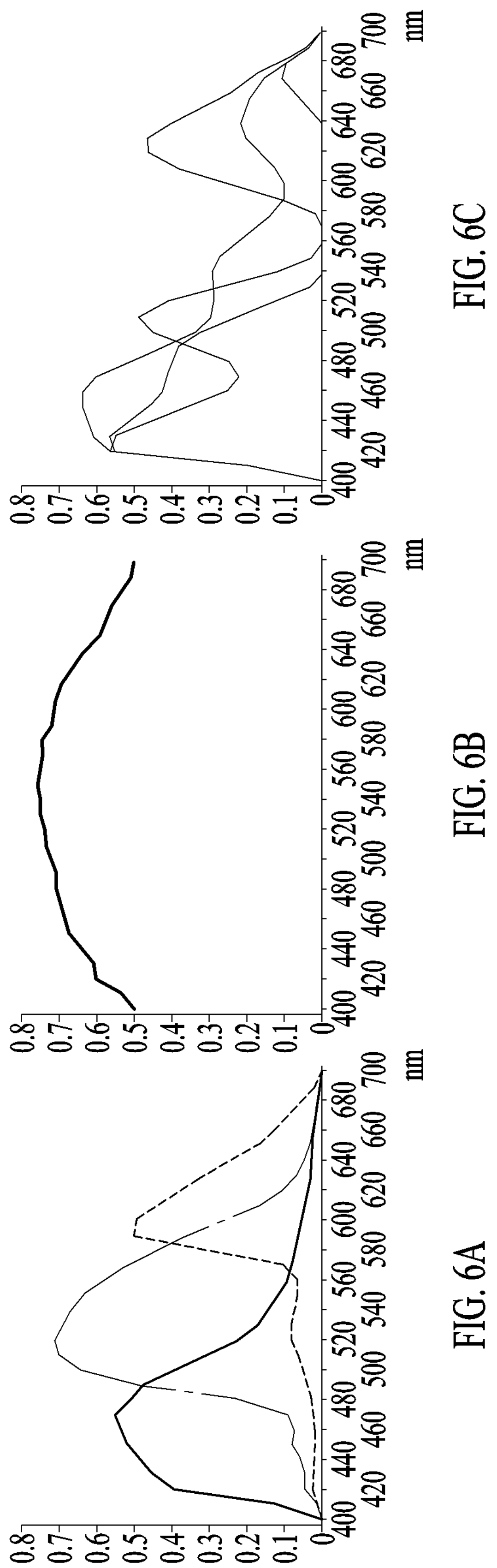
FIGS. 6A to 6C are diagrams illustrating an example of a learned parameter according to an embodiment.

FIGS. 6A to 6C are diagrams illustrating an example of learned parameters according to an embodiment.

FIG. 6A is a graph of a spectrum with learned parameters for an RGB channel, FIG. 6B is an example of a monochrome filter, and FIG. 6C is a graph of a spectrum of a color filter with an edge corrected.

FIGS. 6A to 6C may show a process of optimizing a sensor filter for a specific vision task of edge detection and a sensor filter as a result of the optimization. In a target image having various textures, a reflection image of an object may be obtained with a wide wavelength band and a high wavelength resolution by using an HPI system.

A sensor image may be simulated by using standard illuminants (e.g., D50 and D65 illuminants) and an initial sensor filter spectrum. The sensor image may be input to an edge detection neural network model to output an edge map. Ground truth may be the total sum of edges in all short-wavelength bands of a hyperspectral image, a difference of an output edge compared to the ground truth may be defined as a loss, and the edge detection neural network model and the sensor filter spectrum may be updated in a direction of decreasing the loss. Filters of an embodiment may use a method of optimizing the L1 loss and the gradient descent.

When the filters are applied to an actual image, more change for each wavelength band may be found in FIG. 6C than in FIGS. 6A and 6B. This may be interpreted as an attempt to classify object reflectance for each wavelength band at the most in the limited number of sensor channels (e.g., 3 channels).

The methods according to the above-described embodiments may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware apparatus that are specially configured to store and perform program instructions, such as read-only memory (ROM), random access memory (RAM), flash memory, and the like. Examples of program instructions include both machine code, such as produced by a compiler, and files including higher-level code that may be executed by the computer using an interpreter. The above-described apparatus may be configured to act as one or more software modules in order to perform the operations of the above-described embodiments, or vice versa.

The software may include a computer program, a piece of code, an instruction, or some combination thereof, to independently or uniformly instruct or configure the processing apparatus to operate as desired. Software and data may be embodied permanently or temporarily in any type of machine, component, physical or virtual equipment, computer storage medium or apparatus, or in a propagated signal wave capable of providing instructions or data to or being interpreted by the processing apparatus. The software also may be distributed over network-coupled computer systems so that the software is stored and executed in a distributed fashion. The software and data may be stored by one or more non-transitory computer-readable recording mediums.

While this disclosure includes specific examples, it will be apparent to one of ordinary skill in the art that various changes in form and details may be made in these embodiments without departing from the spirit and scope of the claims and their equivalents. The embodiments described herein are to be considered in a descriptive sense only, and not for purposes of limitation. Descriptions of features or aspects in each embodiment are to be considered as being applicable to similar features or aspects in other embodiments. Suitable results may be achieved if the described techniques are performed in a different order, and/or if components in a described system, architecture, apparatus, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of learning a parameter of a sensor filter, the method comprising:
- performing a simulation on a target image for each spectrum of the sensor filter;
- obtaining an output value by inputting the simulated image to a vision model for a vision task; and
- learning a parameter of the sensor filter based on a loss between a label of the vision model and the output value of the vision model.

2. The method of claim 1, wherein the vision model is a first vision model, and the label of the vision model is a first label, and
- wherein the learning of the parameter of the sensor filter comprises learning the parameter of the sensor filter further based on at least one of:
- a loss between a second label of a second vision model and the output value of the first vision model;
- a loss of the simulated image on the basis of a color space based on a color perception of a human; and
- a normalization loss based on inflection of the simulated image.

3. The method of claim 1, wherein the learning of the parameter of the sensor filter comprises learning the parameter of the sensor filter and a parameter of the vision model to reduce the loss between the label of the vision model and the output value of the vision model.

4. The method of claim 3, wherein the learning of the parameter of the sensor filter and the parameter of the vision model comprises:
- correcting the parameter of the sensor filter and the parameter of the vision model in response to the loss;
- performing a second simulation on the target image based on the corrected parameter of the sensor filter;
- obtaining an output value by inputting the second simulated image to the vision model of which parameter is corrected; and
- calculating a loss between a label of the vision model of which parameter is corrected and the output value of the vision model of which parameter is corrected.

5. The method of claim 1, wherein the learning of the parameter of the sensor filter comprises learning a value of a spectrum corresponding to each of channels included in the sensor filter.

6. The method of claim 1, wherein the vision model comprises at least one of:
- a vision model for edge detection;
- a vision model for segmentation;
- a vision model for object detection;
- a vision model for face recognition; and
- a vision model for super resolution.

7. The method of claim 1, wherein the obtaining of the output value comprises preprocessing the simulated image to correspond to the vision task.

8. The method of claim 7, wherein the preprocessing comprises at least one of:
- removing noise from the simulated image;
- normalizing the simulated image;
- performing a high dynamic range (HDR) processing on the simulated image; and
- adjusting a size of the simulated image.

9. The method of claim 1, wherein the performing of the simulation on the target image for each spectrum of the sensor filter comprises performing the simulation based on an illuminant spectrum and an object reflectance for each wavelength band of the target image.

10. The method of claim 1, wherein the learning of the parameter of the sensor filter comprises:
- calculating the lose between the label of the vision model and the output value of the vision model,
- determining whether the calculated lose is greater than a predetermined target lose, and
- based on the calculated lose being greater than the predetermined target lose, updating the spectrum of the sensor filter.

11. A non-transitory computer-readable storage medium storing instructions that, when executed by a processor, cause the processor to perform a method of learning a parameter of a sensor filter, the method comprising:
- performing a simulation on a target image for each spectrum of the sensor filter;
- obtaining an output value by inputting the simulated image to a vision model for a vision task; and
- learning a parameter of the sensor filter based on a loss between a label of the vision model and the output value of the vision model.

12. An image processing apparatus based on a vision model, the image processing apparatus comprising:
- a sensor filter comprising a plurality of filters specialized for the vision model and configured to have different intensity characteristics;
- one or more processors; and a memory storing one or more programs, wherein the one or more processors are configured to execute the one or more programs to:

receive a target image captured by using the sensor filter, and obtain a result corresponding to a vision task based on the vision model by inputting the received target image to the vision model, wherein the one or more processors are further configured to execute the one or more programs to learn a parameter of the sensor filter to reduce a loss between a label of the vision model and an output value of the vision model by inputting a simulated image with respect to the target image for each spectrum of the sensor filter to the vision model for the vision task and thus obtain an output value.

13. The image processing apparatus of claim 12, wherein the one or more processors are further configured to execute the one or more programs to learn a parameter of the sensor filter.

14. The image processing apparatus of claim 12, wherein the vision model comprises at least one of:

a vision model for edge detection;

a vision model for segmentation;

a vision model for object detection;

a vision model for face recognition; and a vision model for super resolution.

15. The image processing apparatus of claim 12, wherein the one or more processors are further configured to execute the one or more programs to learn a parameter of the sensor filter and the parameter of the vision model based on the loss between the label of the vision model and the output value of the vision model, and wherein the plurality of filters of the sensor filter are configured based on the learned parameter of the sensor filter and the learned parameter of the vision model.

16. The image processing apparatus of claim 12, wherein the one or more processors are further configured to execute the one or more programs to preprocess the simulated image.

17. The image processing apparatus of claim 16, wherein the preprocessing comprises at least one of:

removing noise from the simulated image;

normalizing the simulated image;

performing a high dynamic range (HDR) processing on the simulated image; and adjusting a size of the simulated image.

18. The image processing apparatus of claim 12, wherein the one or more processors are further configured to execute the one or more programs to perform a simulation on the target image based on an illuminant spectrum and an object reflectance for each wavelength band of the target image.

19. The image processing apparatus of claim 12, wherein the one or more processors are further configured to execute the one or more programs to:

calculate the lose between the label of the vision model and the output value of the vision model, determine whether the calculated lose is greater than a predetermined target lose, and based on the calculated lose being greater than the predetermined target lose, update a spectrum of the sensor filter.

* * * * *